United States Patent
Love et al.

(10) Patent No.: US 8,523,511 B2
(45) Date of Patent: Sep. 3, 2013

(54) ADAPTIVE VARIABLE GEOMETRY TURBOCHARGER STRATEGY

(75) Inventors: Andrew C. Love, Epinal (FR); Gary Agnew, Thaon les Vosges (FR); Baptiste Szczyrba, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 1422 days.

(21) Appl. No.: 11/938,999

(22) Filed: Nov. 13, 2007

(65) Prior Publication Data

US 2009/0123272 A1 May 14, 2009

(51) Int. Cl.
F01D 17/00 (2006.01)
F01D 17/16 (2006.01)

(52) U.S. Cl.
USPC .............................................. 415/1; 415/165

(58) Field of Classification Search
USPC .............................................. 415/1, 163–165
See application file for complete search history.

(56) References Cited

U.S. PATENT DOCUMENTS

| | | | |
|---|---|---|---|
| 4,804,316 A | | 2/1989 | Fleury |
| 5,083,434 A | * | 1/1992 | Dahlgren et al. ............... 60/602 |
| 6,212,889 B1 | | 4/2001 | Martin |
| 6,233,934 B1 | * | 5/2001 | Church et al. .................. 60/602 |
| 6,269,642 B1 | | 8/2001 | Arnold et al. |
| 6,360,541 B2 | | 3/2002 | Waszkiewicz et al. |
| 6,681,573 B2 | * | 1/2004 | Arnold ............................ 60/602 |
| 6,694,734 B2 | * | 2/2004 | Akao et al. .................... 60/605.1 |
| 6,990,813 B2 | * | 1/2006 | Ando et al. ..................... 60/602 |
| 7,065,966 B2 | | 6/2006 | Yamada et al. |
| 7,434,397 B2 | * | 10/2008 | Hasegawa ....................... 60/602 |

* cited by examiner

*Primary Examiner* — Nathaniel Wiehe
*Assistant Examiner* — Sean J Younger
(74) *Attorney, Agent, or Firm* — The Law Office of John A. Griecci

(57) ABSTRACT

A variable geometry turbocharger employs multiple vanes in the turbine inlet with a unison ring and integral cast wall in the turbine housing forming the nozzle walls. An actuator rotates the unison ring through a rack and pinion driven crank shaft to move the vanes through a range of vane positions that extends between a hard-stop closed position and a hard-stop open position, and that includes a reference position corresponding to a desired flow condition. A variable geometry turbine controller uses a sensor indicating the actuation position of the actuator to guide the operation of the vanes to the reference position. The controller intermittently directs the actuator to force the vanes to the hard-stop closed and hard-stop open positions, and uses sensor information from those positions to reestablish the reference-position information that the actuator uses to guide the actuation of the vanes.

14 Claims, 3 Drawing Sheets

ADAPTIVE VARIABLE GEOMETRY TURBOCHARGER STRATEGY

This invention relates generally to the field of variable geometry turbochargers. More particularly, the present invention provides apparatus and methods for adjusting the calibration of actuated aerodynamic vanes in an inlet of a turbine housing as the actuation system wears with age and use.

BACKGROUND OF THE INVENTION

For a turbocharger, it is often desirable to control the flow of exhaust gas into the turbine to improve the efficiency or operational range. In a variable nozzle turbine ("VNT"), variable geometry members (e.g., vanes) are employed to control the exhaust gas flow. Typically, multiple pivoting vanes annularly positioned around the turbine inlet and commonly controlled to alter the throat area of the passages between the vanes is a commonly used design. Various approaches to this design are disclosed in U.S. Pat. Nos. 7,065,966, 4,679,984, and 4,804,316, which are incorporated herein by reference for all purposes.

A typical VNT includes an actuator capable of actuating the vanes through a range of flow positions that extends from a hard-stop closed position (a position wherein the vanes have closed off the exhaust flow to a point at which they are physically stopped) to a hard-stop open position (a position wherein the vanes have opened up the exhaust flow to a point at which they are physically stopped). A sensor device can be used to detect the actuation of the actuator, and thereby the position of the vanes.

During normal operation, turbocharger vanes are actuated through a range of positions, the most closed of which is a minimum-flow position that corresponds to a predetermined, fixed mass flow value. Due to tolerances and clearances in the variable geometry system (including the actuation system), there is variability of the vane position and the related actuation position for any given turbocharger when set for a given mass flow. Consequently, the actuation system of each turbocharger must be calibrated during assembly to ensure that it will direct the actuation of the vanes to the appropriate (minimum-flow) position to achieve the fixed mass flow value.

As the turbocharger ages, component wear occurs in the actuation system of the variable nozzle mechanism. As this wear builds up in actuation system components such as rods and gears that mechanically link the actuator to the VNT vanes, the wear creates a slowly increasing offset between the intended vane position and the actual vane position achieved under aerodynamic loading. Due to this drift (i.e., the slowly increasing offset), the memorized minimum-flow actuator actuation position is no longer accurate, and the mass flow no longer reaches the desired mass flow value when the actuator is directed to actuate the vanes to their minimum-flow position. As a result, the turbocharger and related engine operate less efficiently, and emissions increase. These changes can manifest as a noticeable reduction in vehicle performance and changes in transient behavior.

Accordingly, there has existed a need for an apparatus and related methods for an ECU to maintain an accurate record of the minimum-flow position over the life of a turbocharger. Preferred embodiments of the present invention satisfy these and other needs, and provide further related advantages.

SUMMARY OF THE INVENTION

In various embodiments, the present invention solves some or all of the needs mentioned above, typically providing an efficient and reliable turbocharged engine, turbocharger system, and/or turbocharger turbine at low cost and with a simple, lightweight design.

The invention provides for a turbocharger to include a variable geometry controller (i.e., a control system) that implements an adaptive flow strategy to adapt to component wear within an actuation system. More particularly, the turbocharger includes variable geometry members located in an airway of the turbocharger, and an actuator operative through a range of actuation positions to move the variable geometry members through a range of intermediate variable geometry member positions that extend between a hard-stop closed position and a hard-stop open position. These intermediate positions include a reference position corresponding to a desired flow condition. The turbocharger further includes a sensor configured for sensing actuation information indicating the actuation position of the actuator.

The control system includes a memory device operative for reading and writing information, and a processing device operative with the memory to write and read positional information. The positional information includes reference-position information identifying sensed actuation information corresponding to the reference position, and variation information identifying a baseline to determine variations in the accuracy of the reference-position information. The processing device is operative to intermittently direct the actuator to actuate the variable geometry member to the hard-stop closed position, to read the actuation information sensed by the sensor device at the hard-stop closed position, and to reestablish the reference-position information based on the sensor information read at the hard-stop closed position.

Advantageously, sensor readings during the hard-stop actuation provide information on the wear of the components of the actuation system, and thus provide a measure on the accuracy with which the actuation system is directing the variable geometry members to their respective reference position(s). Further, the same sensor readings may provide information to reestablish the reference-position information so as to account for the wear of the components and thereby better provide for the vanes to be actuated to their reference positions.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a variable geometry controller for a turbocharger, along with associated methods and apparatus (e.g., compressors, turbochargers and turbocharged internal combustion engines). These embodiments are assemblies that provide for improved pressure ratios and/or related flow characteristics through the use of an actuation system implementing an adaptive control strategy configured to actuate a plurality of vanes exclusively through a range of positions.

Figure 1:
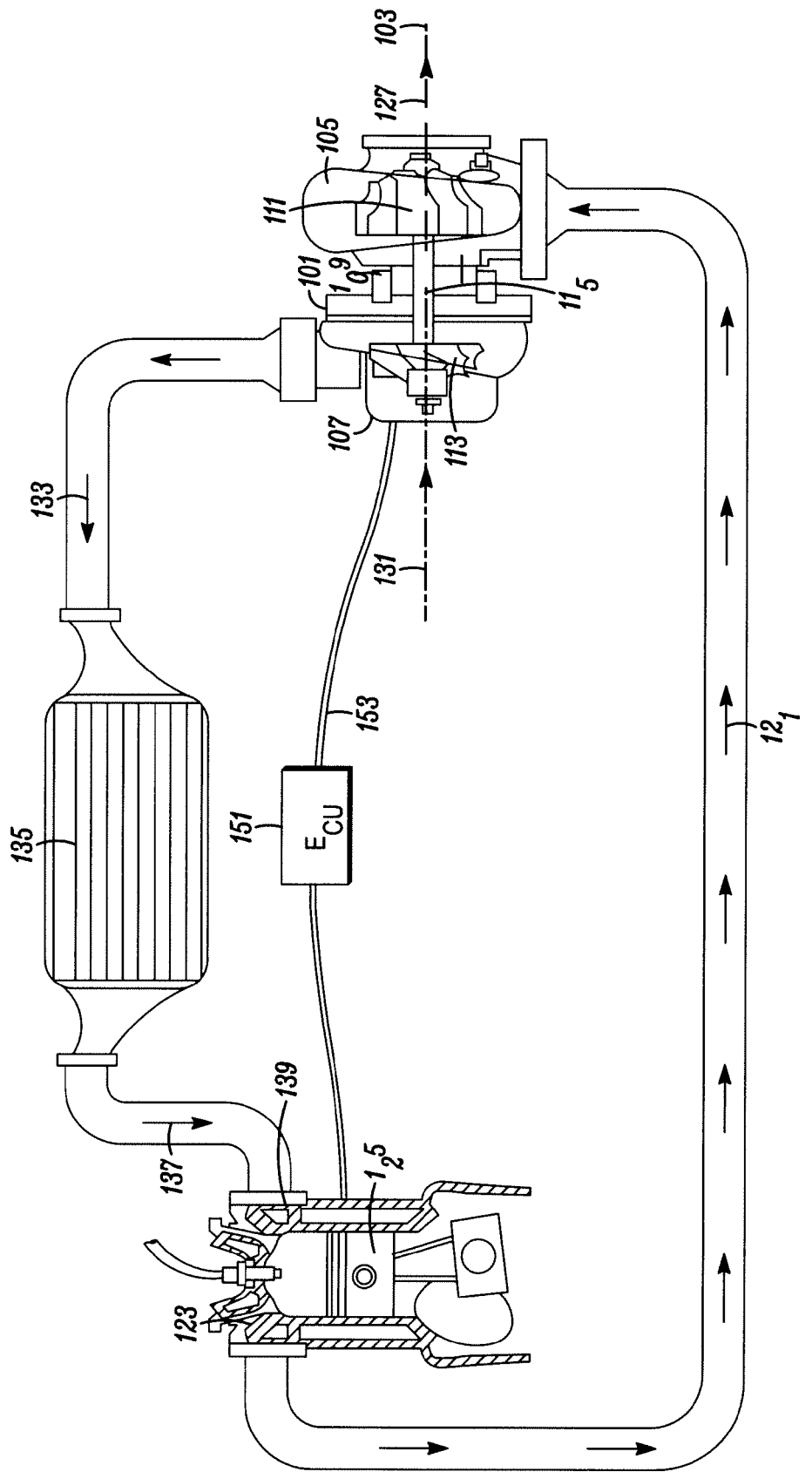
FIG. 1 is a system layout of an internal combustion engine with a turbocharger and a charge air cooler embodying the present invention.
Figure 2:
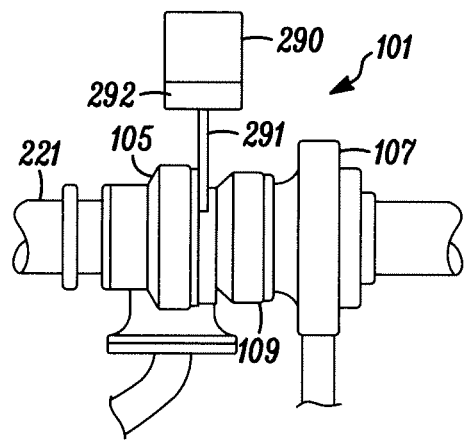
FIG. 2 is a more detailed plan view of the turbocharger that is part of the system depicted in FIG. 1.
Figure 3:
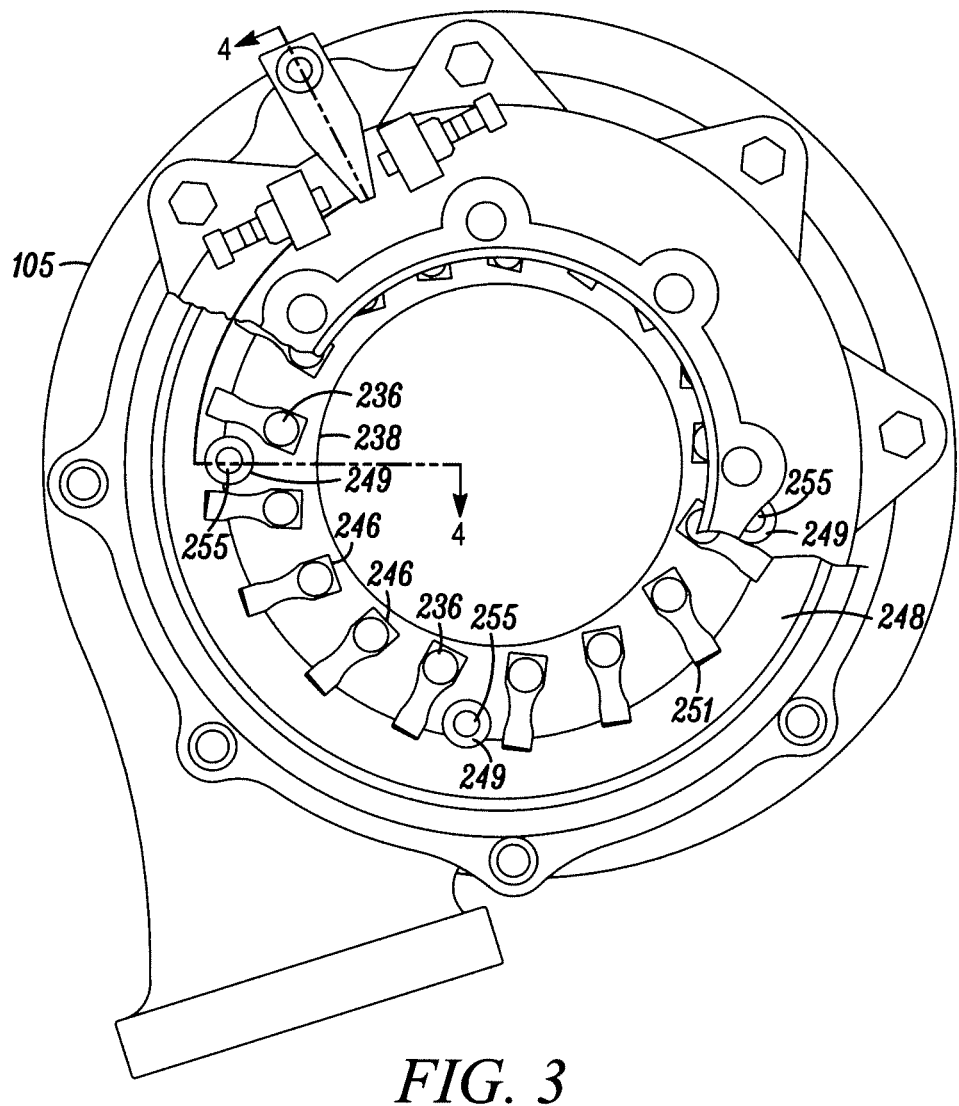
FIG. 3 is a cut-away side view of the turbine depicted in FIG. 2.

With reference to FIG. 1, in a first embodiment of the invention a turbocharger 101 includes a turbocharger housing and a rotor configured to rotate within the turbocharger housing along an axis of rotor rotation 103 on thrust bearings and journal bearings (or alternatively, other bearings such as ball bearings). The turbocharger housing includes a turbine housing 105, a compressor housing 107, and a bearing housing 109 (i.e., center housing) that connects the turbine housing to the compressor housing. The rotor includes a turbine wheel 111 located substantially within the turbine housing, a compressor wheel 113 located substantially within the compressor housing, and a shaft 115 extending along the axis of rotor rotation, through the bearing housing, to connect the turbine wheel to the compressor wheel.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature, over that of the input air. Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

With reference to FIGS. 1-4, the turbine housing 105 forms a generally scroll-shaped volute 228 which accepts the exhaust gas from the engine 125 and directs it onto blades 214 of the turbine wheel 111 through an annular passage 230. Thereafter, the exhaust gas flows axially through a turbine shroud 232 and exits the turbocharger through an outlet 221 to the exhaust system (either into a suitable pollution-control device or the atmosphere) as the exhaust gas stream 127.

Placed within the annular passageway 230 are a plurality of pivotable vanes 234, which operate to vary the geometry of the annular passage 230 to control the angle at which the exhaust gas impacts the blades 214 of the turbine wheel 111. This in turn controls the amount of energy imparted to the compressor wheel 113, and ultimately the amount of air supplied to the engine.

The variable geometry turbine nozzle of the present embodiment is located between the center housing 109 and a turbine housing end of the turbocharger 101. A flange member 224 and the turbine housing 105 form a cavity 227 between the two in their assembled state which locates the hardware used in conjunction with the variable geometry turbine nozzle as will be described below. The exhaust gas present within volute 228 flows through the annular passageway 230 formed by an inner or side wall 231 of the turbine housing 105 and an annular nozzle ring 238.

Located circumferentially around and within the annular passage 230 is the plurality of vanes 234. The plurality of vanes is mounted to the nozzle ring 238, which has a plurality of radially spaced bores therethrough to accommodate a vane pin 236 associated with each vane 234. Attached to the other end of each vane pin is a vane arm 246, the shape of which can be best seen in FIG. 3. The vane arm is attached to the vane pin 236 by welding, thereby rotatably attaching the vanes 234 to the nozzle ring 238 such that the nozzle ring is between the vane and vane arm. However, any suitable method of attachment can be used.

Located within the annular passage 230 is a plurality of spacers 286. As shown, the spacers 286 are located at the periphery of the plurality of vanes and sized such that they have an axial length of 0.002 to 0.006 inches longer than the vane length. Spacers are press fit within a bore formed in the nozzle ring 238, though any method of attaching the spacers to the nozzle ring or turbine side wall can be used.

A unison ring 248 is formed as an annular ring with a plurality of slots 251 on its inner radial surface. Each slot receives one of the vane arms 246. At the inner periphery of the unison ring 248 are located at least three radially spaced rollers 249. The rollers 249 are rotatably mounted on dowels 255 radially inwardly of the unison ring, and are secured between the flange member 224 and the nozzle ring 238, each having bores for acceptance of the dowel. The dowels 255 have some axial clearance within these bores in order to allow the nozzle ring 238 slight axial movement. The rollers 249 include an annular groove therearound for acceptance of the inner periphery of the unison ring 248. The dowels 255 and rollers 249 could be provided at the outer periphery of the unison ring 248 if so desired.

The dowels 255 further perform the function of preventing the nozzle ring 238 from rotating. These rollers 249 provide for ease of rotation of the unison ring 248 relative to the flange member 224, and together with the dowels 255 ensure the concentricity between the unison ring 248 and the nozzle ring 238, and the concentricity between the nozzle ring and the flange member. The shape of the vane arms 246 must be such as to maintain basically a rolling action within the slots 251 to avoid binding within the unison ring 248 as it rotates to pivot the vanes 234.

The flange member 224 includes a recessed portion for acceptance of the actuation system as will be described below. Formed in the flange member 224 is a shoulder 272 which acts in cooperation with a Belleville spring 240. An inboard side (the side facing the center housing) of a radially outer edge of the Belleville spring 40 rests against the shoulder 272, and when assembled, an outboard side of a radially inner edge of the Belleville spring acts against a shoulder portion 239 of the nozzle ring 238 such that it loads the nozzle ring 238 and the pins 286 against the side wall 231. The shoulder 272 is continuous about the flange 224 with the exception of a break to make room for the bell crank system defined below.

A tube member 242 is of a generally cylindrical shape, with an annular bend therein. The tube member 242 is sized as that it is slidably engageable within the inner radial surface of the nozzle ring 238. The tube member 242 acts as a seal in the event any exhaust gas leaks behind the nozzle ring 238 and into the cavity 227 formed between the flange 224 and the turbine housing 105, thereby sealing the turbine housing 105 from the center housing 109.

The vanes are movable between two hard-stop positions, i.e., a hard-stop closed position in which the vanes are physically impeded from closing further, and a hard-stop open position in which the vanes are physically impeded from opening further. The hard-stop closed position may be defined by the vane fully closed position (i.e., each vane impeding the next), or by adding as an additional feature a physical stop for the vanes. The physical stops could be one or more features (e.g., protrusions or a ridge) that impede the vanes from closing further, or alternatively, an actuation system characteristic limitation (such as a physical limitation in how far the unison ring can move to drive the vanes). In the later case, the control system might not be able to adapt to looseness downstream (on the vane side) of the limitation.

Figure 4:
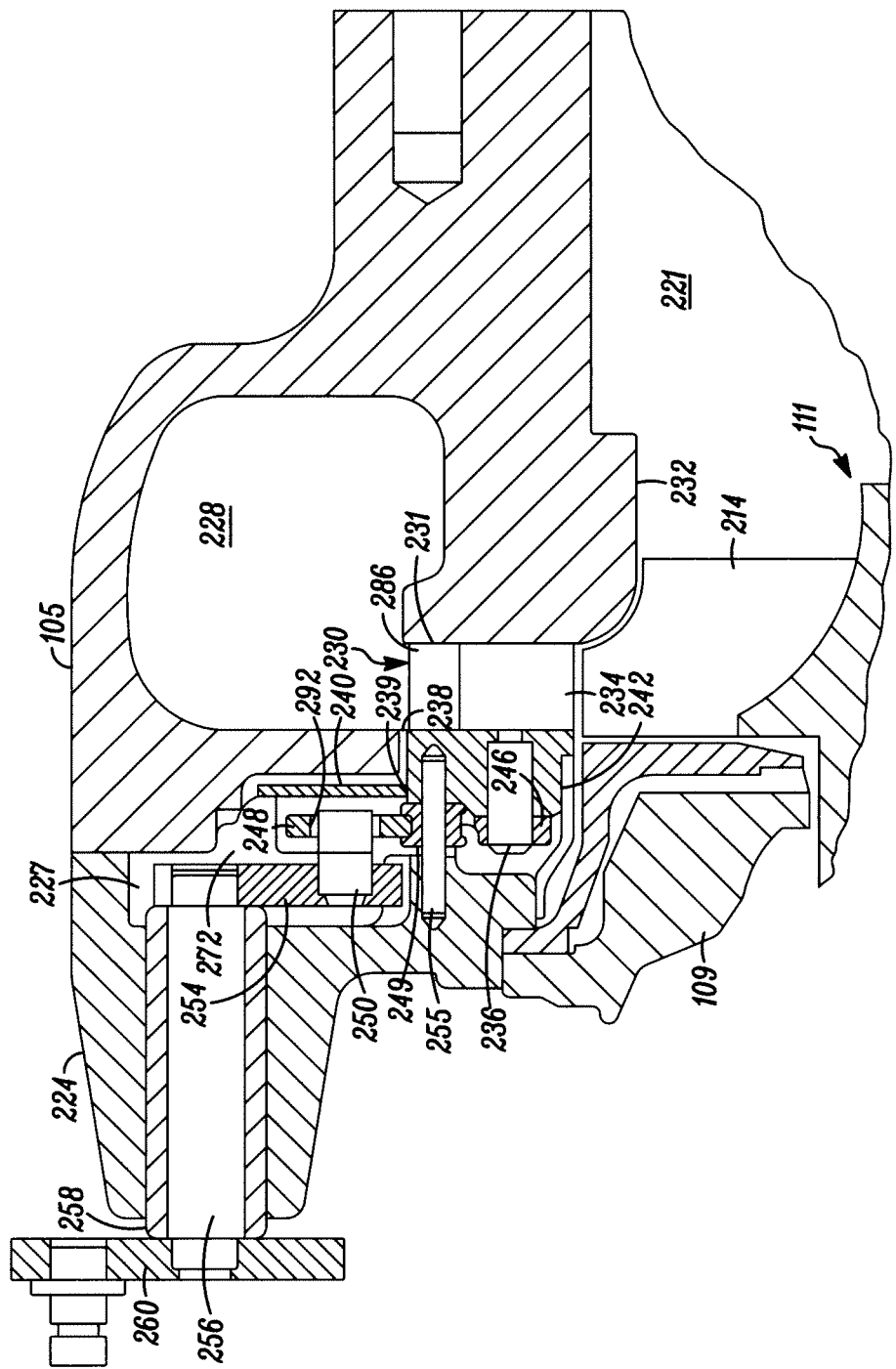
FIG. 4 is a cross-sectional view of a portion of the turbine depicted in FIG. 3, as identified by FIG. 3.

A bell crank system is used in order to rotate the unison ring 248 between its two hard-stop positions, which are the unison-ring positions that necessarily drive the vanes to their corresponding hard-stop closed and open positions. More particularly, a pin 250 is rigidly connected to a first linkage member 254 at one end thereof. The pin 250 fits within a corresponding slot 292 within the unison ring 248 in order to transmit any movement in the bell crank to the unison ring 248. The first linkage member 254 is rigidly connected at a second end to an intermediate rod 256. The intermediate rod 256 projects through a bore in the flange member 224 to a point outside the turbocharger assembly. A bushing 258 is used in association with the intermediate rod 256. The intermediate rod 256 is rigidly connected at its other end to a second linkage member 260 which in turn is connected to an actuator 290 by an actuator rod 291, as shown in FIG. 4.

The actuator may be a pneumatic actuator, which is well known in the art. Alternatively, within the scope of the invention the actuator may be an actuator of another type, such as a rotary electric actuator ("REA"). One example of an REA can be found in U.S. Pat. No. 6,360,541, which is incorporated herein by reference for all purposes.

During operation, a linear movement of the actuator rod 291 drives the second linkage member 260 in rotation. This rotation drives the first linkage member 254 in rotation via the intermediate rod 256. The pin 50 translates movement of the first linkage member 254 into rotational movement of the unison ring 248. In turn, the vane arms 246 roll against the side wall of the slots 251 to pivot vanes 234 while the nozzle ring 238 remains stationary. Thus, in response to a linear movement of the actuator rod, there is a change in the geometry of the plurality of passageways formed between adjacent vanes. In the alternative case of an REA, the change in geometry of the plurality of passageways is in response to a rotation of the actuator rod, as is known in the art.

As described above, the embodiment forms a variable geometry turbine including variable geometry members (i.e., the vanes 234) located in an inlet (i.e., the annular passage 230) of the turbine, an actuator (the actuator 290) operative through a range of actuator (translational or rotational) positions to move the variable geometry members through a range of variable geometry member positions extending between a hard-stop closed position and a hard-stop open position. While these hard-stop positions can be reached by actuator actuation, in normal operation the variable geometry members are not driven all the way to the hard-stops, to limit the effects of the hard-stop impact on the actuator or connecting linkages.

Instead, operational soft-stop positions (i.e., predetermined vane positions short of the extreme hard-stop positions) are used as the limits of movement in normal operation. These soft-stop positions define reference positions that correspond to desired minimum-flow and maximum-flow conditions. The accuracy of these positions with respect to achieving the intended flow rates is critical for the subsystem of the ECU that operates as a variable geometry turbine controller ("VGTC") to control the vanes for efficient turbocharger operation. It should be noted that the VGTC could alternatively be incorporated within an REA, or be formed within the combined system of an interconnected ECU and REA.

In order to accurately control actuation of the vanes 234 between these soft stops, the turbine includes a sensor 292 configured for sensing actuation information. The actuation information indicates the actuation position of the actuator rod 291 relative to the remainder of the actuator 290 at any given time. More particularly, the sensor senses the actuated displacement of the actuator rod, which directly relates to displacement of the vanes. For a pneumatic actuator this would typically be a longitudinal displacement, but for an REA it would typically be a rotational displacement. The VGTC is programmed with a transfer function such that the VGTC can calculate the position of the vanes from the sensed actuation information.

As was previously noted, each turbocharger must be calibrated during assembly to ensure that the same minimum flow rate can be achieved at the minimum-flow soft-stop in light of the inherent variability of the vane position due to tolerances and clearances. The calibration is based on the relationship between the actuation position and the vane position during turbocharger operation. More particularly, the calibration establishes a vane position that achieves the desired minimum-flow soft-stop flow rate, along with a related actuation position necessary to achieve the desired minimum-flow soft-stop vane position during operation.

As the turbocharger ages, component wear occurs in the actuation system of the variable nozzle mechanism. This wear looseness the connection between the actuator and the vanes. The looseness allows the vanes a greater range of motion for a given actuator actuation position (i.e., the displacement of the actuator rod with respect to the rest of the actuator, as measured by the sensor). Under aerodynamic loading, this looseness allows the vanes to blow to a position different from the position they would hold without the looseness. As a result, the looseness changes the relationship (and thereby the correct transfer function) between the sensed actuator actuation position and the vane position during turbocharger operation (i.e., aerodynamic loading).

Thus, the wear (i.e., the looseness) creates an offset between the actuation position for the aerodynamically loaded, loosened vanes to be at their desired minimum-flow soft-stop vane position, and the actuation position for the aerodynamically loaded, original-condition vanes (i.e., the vanes before the actuation system became loosened) to be at their desired minimum-flow soft-stop vane position. Likewise, the wear creates a similar offset between the actuation position for the loosened, hard-stop closed position, and the actuation position for the original-condition hard-stop closed position. Additionally, the looseness increases the range of actuation positions over which the actuator must travel to necessarily force the vanes to move between their hard-stop closed and open positions (despite any looseness).

To compensate for this offset, the VGTC is programmed with an adaptive minimum flow strategy. More particularly, at certain intervals the VGTC tests the actuation system to establish whether the system has experienced enough wear for the present transfer function to create a significant offset between the desired vane position and the vane position actually achieved. If such wear has occurred, the VGTC establishes a new transfer function that better describes the vane position (s) with respect to the actuation position.

In the presently described embodiment, the VGTC tests the actuation system at each key-on occurrence of the engine (i.e., the test interval). In order to test whether the system has experienced significant wear, the VGTC directs the actuator to force the vanes fully between the hard-stop closed and hard-stop open positions. It should be noted that the aerodynamic loading naturally moves each vane towards its most open position (within the small range of movement the looseness provides), and thus the vane may reach the hard-stop open position prior to the actuator forcing it to the hard-stop open position. This is not the case for the hard-stop closed end of the movement, since the aerodynamic loading will prevent each vane from reaching the hard-stop closed position until the actuator forces it to that position.

The VGTC monitors the sensor readings when the vanes are forced by the actuator to the hard-stop positions, and calculates the related range of actuator displacement. It should be understood that the test of the actuation system does not direct the turbocharger to operate at efficient levels, and thus the test is not considered to be a normal operating condition (which was previously described as not exceeding the soft-stop positions).

The VGTC then compares this displacement range to a previously measured displacement range that was measured at the time the present transfer function was established. A larger displacement range indicates increased looseness in the actuation system, and thus additional wear. The presently measured displacement range is considered to vary significantly from the previously measured displacement range if the change in wear would create a significant offset between a desired vane position (e.g., the minimum-flow soft-stop position) and the related vane position actually achieved based on the present transfer function. The level(s) of displacement range variation necessary to be considered significant form a standard of comparison that can be analytically or experimentally established based on changes in turbocharger operation due to the varied vane position, and can be stored in the VGTCs programming code or data. That standard can be a constant value for a given turbocharger, or can be a function of any variables that appear (in experimentation or analysis) to affect the operation of the turbocharger.

If a significant range variation is detected, the VGTC establishes the new minimum-flow soft-stop position of the vanes to be at a preestablished offset from the newly measured hard-stop closed position. The preestablished offset can be initially determined by the VGTC when it first operates with the turbocharger (which has been recently calibrated). If additional reference positions are used, they can be reestablished based on the newly measured hard-stop closed position, the newly measured hard-stop open position, or a combination of both newly measured positions.

While the described embodiment uses the displacement range between the hard-stop closed and open positions as variation information that establishes a level of component wear in the actuation system, it should be understood that other variation information could be used as a basis for determining component wear. For example, comparing only the present hard-stop closed position to a baseline of the prior hard-stop closed position (from the time when the present minimum-flow soft-stop position was established) would be an alternative. Furthermore, while the described processing device is configured to re-establish the reference position only when newly measured displacement-range information varies from previously measured displacement-range information by at least a predetermined standard, it should be understood that the reference position could be reestablished at every test interval.

The VGTC includes a memory device operative for reading and writing information, and a processing device operative with the memory to write and read positional information to the memory device. The positional information includes reference-position information identifying sensed actuation information corresponding to the reference position (e.g., the presently used actuation position that relates to the minimum-flow soft-stop position), and further includes variation information identifying a baseline to determine variations in the accuracy of the reference-position information (i.e., the hard-stop closed and open positions at the time the present reference-position information was established, and/or the displacement range between the hard-stop closed and open positions at the time the present reference-position information was established).

The processing device is operative (i.e., programmed via software or hardware) to read the actuation information sensed by the sensor device, to intermittently direct the actuator to actuate the variable geometry member to the hard-stop closed position (and to the hard-stop open position), and to re-establish the reference-position information based on the sensor information read during that actuation (e.g., when sensor readings indicate that significant wear has occurred). The processing device is also operative to re-establish the reference-position information from the sensor information read while the variable geometry member is at the hard-stop closed position and calculating what the sensor information should be with the variable geometry member at a predetermined angular increment from the hard-stop position.

The processing device is further operative to read the reference-position information from the memory, and to direct the actuator to actuate the variable geometry member to the reference position (based on the read reference-position information) whenever the related flow conditions are appropriate for efficient operation of the turbocharger. As previously mentioned, typically the reference position (or one such reference position) is the lowest-flow position to which the processing device will direct the actuator to actuate the variable geometry member during normal operation of the turbine. Another reference position can be the highest-flow position to which the processing device will direct the actuator to actuate the variable geometry member during normal operation of the turbine.

In operation, the described VGTC controls the operation of a variable geometry turbine that includes a variable geometry member located in an inlet of the turbine by controlling an actuator configured to actuate the variable geometry member through a range of flow positions that extends between a hard-stop closed position and a hard-stop open position. The actuator includes a sensor device configured for sensing information on the extent of actuator actuation.

More particularly, the VGTC establishes reference-position information for guiding the operation of the variable geometry member to a reference position intermediate the hard-stop closed position and the hard-stop open position. Additionally, the VGTC intermittently directs the actuator to actuate to the hard-stop closed position, and re-establishes the reference-position information based on sensor information read during that actuation.

It is to be understood that the invention further comprises related apparatus and methods for designing turbocharger systems and for producing turbocharger systems, as well as the apparatus and methods of the turbocharger systems themselves. In short, the above disclosed features can be combined in a wide variety of configurations within the anticipated scope of the invention.

While particular forms of the invention have been illustrated and described, it will be apparent that various modifications can be made without departing from the spirit and scope of the invention. The control system of the invention could be adapted to actuate a variable geometry member of a wide variety of turbines, including the turbine disclosed in U.S. Pat. No. 4,804,316, which is incorporated herein by reference for all purposes. Moreover, the control system could be adapted to actuate variable geometry members of a compressor of a given turbocharger, using actuators and sensors known in the art for compressors. Accordingly, the invention is not intended to be limited by the above discussion, and is defined with reference to the following claims.

What is claimed is:

1. A variable geometry turbine controller for operation with a variable geometry turbine including a variable geometry member located in an inlet of the turbine, an actuator operative through a range of actuation positions to move the variable geometry member through a first range of variable geometry member positions that extends between a hard-stop closed position and a hard-stop open position, and that includes a smaller, second range of variable geometry member positions intermediate the hard-stop closed position and the hard-stop open position corresponding to desired flow conditions, and a sensor configured for sensing actuation information indicating the actuation position of the actuator, comprising:
   a memory device operative for reading and writing information; and
   a processing device operative with the memory device to write and read positional information, including a transfer function relating sensed actuation information to actual variable geometry member positions throughout the second range of variable geometry member positions;
   wherein the processing device is operative to intermittently direct the actuator to actuate the variable geometry member to the hard-stop closed position, to read the actuation information sensed by the sensor device with the variable geometry member at the hard-stop closed position, and to re-establish the transfer function based on sensor information read with the variable geometry member at the hard-stop closed position.

2. The variable geometry turbine controller of claim 1, wherein the processing device is operative to read the transfer function, and to direct the actuator to actuate the variable geometry member to positions throughout the second range of variable geometry positions based on the transfer function.

3. The variable geometry turbine controller of claim 1, wherein a first end of the second range of variable geometry member positions is the lowest flow position to which the processing device will direct the actuator to actuate the variable geometry member during normal operation of the turbine.

4. The variable geometry turbine controller of claim 1, wherein the processing device is operative to re-establish the transfer function by reading the sensor information while the variable geometry member is at the hard-stop closed position, and calculating what the sensor information should be with the variable geometry member at a predetermined angular increment from the hard-stop closed position.

5. The variable geometry turbine controller of claim 1, wherein the transfer function is re-established based on measured displacement-range information regarding a displacement range over which the actuator operates to force the variable geometry member between the hard-stop closed position and the hard-stop open position.

6. The variable geometry turbine controller of claim 5, wherein the processing device is configured to re-establish the transfer function only when newly measured displacement-range information varies from previously measured displacement-range information by at least a predetermined standard.

7. The variable geometry turbine controller of claim 1, wherein:
   the transfer function is re-established based on measured displacement-range information regarding a displacement range over which the actuator operates to force the variable geometry member between the hard-stop closed position and the hard-stop open position;
   the processing device is configured to re-establish the transfer function only when newly measured displacement-range information varies from previously measured displacement-range information by at least a predetermined standard;
   a first end of the second range of variable geometry member positions is the lowest flow position to which the processing device will direct the actuator to actuate the variable geometry member during normal operation of the turbine; and
   the processing device is operative to re-establish the transfer function by reading the sensor information while the variable geometry member is at the hard-stop closed position, and calculating what the sensor information should be with the variable geometry member at a predetermined angular increment from the hard-stop position.

8. A method for controlling the operation of a variable geometry turbine that includes a variable geometry member located in an inlet of the turbine, an actuator configured to actuate the variable geometry member through a first range of variable geometry member positions that extends between a hard-stop closed position and a hard-stop open position and that includes a smaller, second range of variable geometry member positions corresponding to desired flow conditions, and a sensor device configured for sensing actuation information on the extent of actuator actuation, comprising:
   establishing a transfer function relating sensed actuation information to actual variable geometry member positions throughout the second range of variable geometry member positions for guiding the operation of the variable geometry member;
   intermittently directing the actuator to actuate the variable geometry member to the hard-stop closed position, and re-establishing the transfer function based on sensor information read at the hard-stop closed position.

9. The method for controlling the operation of a variable geometry turbine of claim 8, wherein in the step of intermittently directing the actuator, the actuator is further actuated to force the variable geometry member to the hard-stop open position, and the transfer function is reestablished based on sensor information read at both the hard-stop closed position and the hard-stop open position.

10. A turbocharger including a variable geometry controller, the turbocharger including a variable geometry member located in an airway of the turbocharger, an actuator operative through a range of actuation positions to move the variable geometry member through a first range of variable geometry member positions that extends between a hard-stop closed position and a hard-stop open position, and that includes a smaller, second range of variable geometry member positions corresponding to desired flow conditions intermediate the hard-stop closed position and the hard-stop open position corresponding to desired flow conditions, and a sensor configured for sensing actuation information indicating the actuation position of the actuator, comprising:

a memory device operative for reading and writing information; and
 a processing device operative with the memory device to write and read positional information, the written and read positional information including a transfer function relating sensed actuation information to actual variable geometry member positions throughout the second range of variable geometry member positions;
 wherein the processing device is operative to intermittently direct the actuator to force the variable geometry member to a hard-stop position, to read the actuation information sensed by the sensor device with the variable geometry member forced to the hard-stop position, and to re-establish the transfer function based on the sensor information read with the variable geometry member at the hard-stop position.

11. The turbocharger of claim 10, wherein the the transfer function is re-established based on measured displacement-range information regarding a displacement range over which the actuator operates to force the variable geometry member between the hard-stop closed position and the hard-stop open position.

12. An actuator for operation with a variable geometry turbine including a variable geometry member located in an inlet of the turbine, comprising:

an actuation mechanism operative through a range of actuation positions to move the variable geometry member through a first range of variable geometry member positions that extends between a hard-stop closed position and a hard-stop open position, and that includes a smaller, second range of variable geometry member positions corresponding to desired flow conditions intermediate the hard-stop closed position and the hard-stop open position corresponding to desired flow conditions;
 a sensor configured for sensing actuation information indicating the actuation position of the actuator;
 a memory device operative for reading and writing information; and
 a processing device operative with the memory device to write and read positional information, including a transfer function relating sensed actuation information to actual variable geometry member positions throughout the second range of variable geometry member positions;
 wherein the processing device is operative to intermittently direct the actuation mechanism to actuate the variable geometry member to the hard-stop closed position, to read the actuation information sensed by the sensor device with the variable geometry member at the hard-stop closed position, and to re-establish the transfer function based on sensor information read with the variable geometry member at the hard-stop closed position.

13. The actuator of claim 12, wherein the actuation mechanism is a rotary electric actuation mechanism.

14. The actuator of claim 12, wherein the transfer function is re-established based on measured displacement-range information regarding a displacement range over which the actuation mechanism operates to force the variable geometry member between the hard-stop closed position and the hard-stop open position.

* * * * *